United States Patent [19]
Bowman

[11] Patent Number: 5,635,058
[45] Date of Patent: Jun. 3, 1997

[54] REJECT WATER DRAIN LINE INSTALLATION SYSTEM AND APPARATUS FOR UNDER SINK REVERSE OSMOSIS FILTER SYSTEM

[76] Inventor: Dennis E. Bowman, 2637 Whitewood Ave., Ann Arbor, Mich. 48104

[21] Appl. No.: 406,182

[22] Filed: Mar. 16, 1995

Related U.S. Application Data

[63] Continuation-in-part of Ser. No. 206,850, Mar. 7, 1994.

[51] Int. Cl.$^6$ ................................................. B01D 35/027
[52] U.S. Cl. ..................... 210/172; 210/232; 210/418; 210/460; 285/155; 137/216; 138/120; 138/177
[58] Field of Search ...................................... 210/232, 418, 210/460, 153, 172, 248, 251, 321.6, 500.21; 285/156, 180, 155; 137/216, 216.1; 138/37, 89, 109, 120, 155, 177

[56] References Cited

U.S. PATENT DOCUMENTS

| | | |
|---|---|---|
| 2,122,051 | 6/1938 | Baird . |
| 2,302,617 | 11/1942 | Little . |
| 2,644,543 | 7/1953 | Russell ................................. 285/155 |
| 2,834,615 | 5/1958 | Bleakley ............................... 285/156 |
| 3,346,887 | 10/1967 | Sommer . |
| 3,620,241 | 11/1971 | Brown . |
| 4,145,768 | 3/1979 | Chevrette . |
| 4,221,406 | 9/1980 | Traylor . |
| 4,250,920 | 2/1981 | Traylor . |
| 4,454,891 | 6/1984 | Dreibelbis et al. . |
| 4,721,331 | 1/1988 | Lemelshtrich ......................... 285/319 |
| 4,771,485 | 9/1988 | Traylor . |
| 4,856,121 | 8/1989 | Traylor . |
| 4,882,061 | 11/1989 | Petrucci et al. . |
| 4,998,754 | 3/1991 | Matsumoto et al. ..................... 285/156 |
| 5,039,134 | 8/1991 | Meadows et al. ...................... 285/155 |
| 5,104,150 | 4/1992 | Bard et al. . |
| 5,119,860 | 6/1992 | Slovak et al. . |
| 5,132,017 | 7/1992 | Birdsong et al. . |
| 5,143,601 | 9/1992 | Slovak et al. . |
| 5,152,321 | 10/1992 | Drager et al. . |
| 5,176,165 | 1/1993 | Traylor . |

OTHER PUBLICATIONS

Xerox copy of skin pack card (front face and rear face) of P5475 Model Plumbshop Dishwasher Branch Connector: Rubber Boot w/plastic insert & Clamps.
Water Factory Systems–Series N4000, N4500, N5000 (98–880019 Rev. A) Dearborn Brass—Effective Jul. 1, 1992 (Cover/Back and pp. 7, 8, 10, 11, 12.
Brass Craft—(pp. E–1, E–2, E–3, E–4, E–5).

*Primary Examiner*—W. L. Walker
*Attorney, Agent, or Firm*—Barnes, Kisselle, Raisch, Choate, Whittemore & Hulbert, P.C.

[57] ABSTRACT

A method, system and adapter couplings for draining the reject bypassed waste water from a reverse osmosis (R/O) filtration unit to a sewer line, and particularly adapted for use in a household or commercial undercounter R/O water filtration installation associated with an in-counter sink having a garbage disposer with its outlet connected by standard plumbing fittings to a sink drain trap in turn plumb to the sewer system. The R/O waste water drain line tube is coupled into the sink drain trap in serial drainage relation with the disposer outlet plumbing fittings by a special convertable Y-Tee plumbing fitting having an R/O drain tube inlet branch and a dishwasher drain hose inlet branch oriented at an acute angle to one another with their respective input drainage liquid flows converging at a common hose nipple outlet of the Y-Tee. The garbage disposer dishwasher drain water inlet nipple is coupled by a standard coupling hose and hose clamps to the Y-Tee outlet. The Y-Tee has a push-in type connector in its R/O inlet branch connected to the R/O waste water drain tube outlet. For an installation when no dishwasher is present the R/O branch inlet of the adapter coupling is severed therefrom and thereby becomes a straight-in coupling fitting for hose and hose clamp coupling thereof to the disposer inlet nipple.

24 Claims, 3 Drawing Sheets

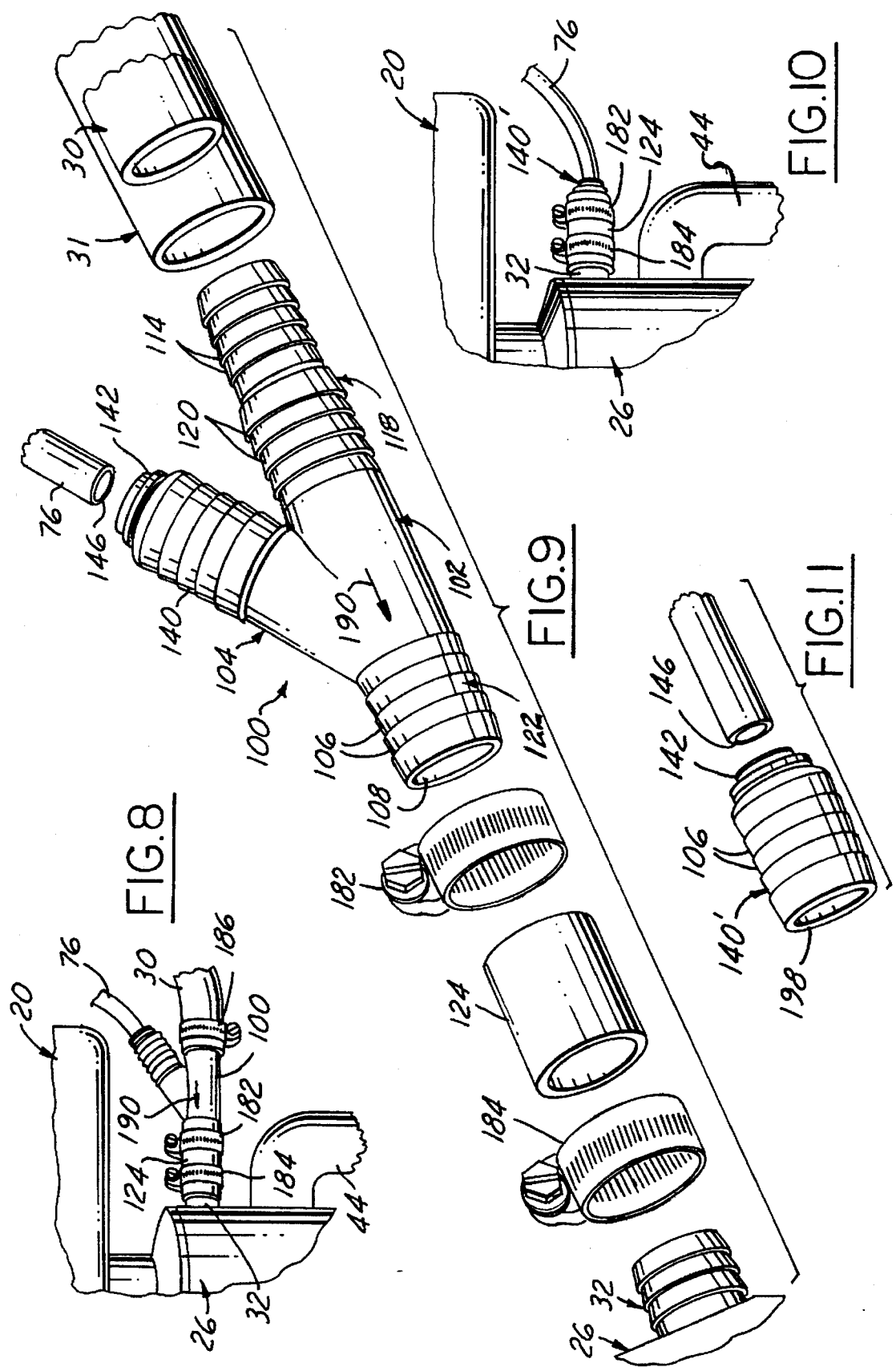

REJECT WATER DRAIN LINE INSTALLATION SYSTEM AND APPARATUS FOR UNDER SINK REVERSE OSMOSIS FILTER SYSTEM

REFERENCE TO CO-PENDING APPLICATIONS

This application is a continuation-in-part of my co-pending application Ser. No. 08/206,850 filed Mar. 7, 1994.

FIELD OF THE INVENTION

The present invention relates generally to dispensing systems for potable water, and more particularly to improvements in drain line installation systems and apparatus for disposing of reject water from an under sink reverse osmosis water filter system into an existing household or commercial plumbing system.

BACKGROUND OF THE INVENTION

Reverse osmosis systems (referred to alternatively herein as "R/O" Systems) applied to the purification of water are known in the art. Their use is expanding rapidly for the production of relatively small quantities of potable water for household uses.

Such reverse osmosis systems under normal operating conditions produce a continuous flow of waste water, which may amount to as much as 75% of the input water volume, and which may have a high salt content. This waste water or brine must have a continuous drainage facility for removing this processed water from the reverse osmosis system. In this respect, for the safety of the system and to meet laws and ordinances of towns and municipalities, particularly where such drainage facilities are connected to the sewer system, an adequate anti-syphon means is required to prevent the possibility of sewage or tainted water backing into the R/O System through the drain for the waste water or brine. Generally this is in the form of an air gap in the drain line at a specified height above the waste water basin overflow plane for undercounter installation set-ups.

Typically, most kitchen counter single compartment sinks have their sole bottom outlet plumbed directly to the main waste inlet of a conventional garbage disposer unit. Waste water from the sink flows through the garbage disposer and exists horizontally via an outlet plumbing elbow, provided with and attached to the disposer at its lower side, which leads through a 90° bend vertically downwardly into the upper inlet end of a standard plastic or brass tubular plumbing trap. The disposer may also have a dishwasher drain line connected into a disposer inlet nipple in the upper side thereof and that feeds waste water from the dishwasher through the disposer and out of the disposer outlet.

Hitherto, a serious problem has existed with respect to undercounter R/O Systems installations, particularly retrofit installations, with respect to the manner and means for connecting the outlet end of the waste water drain line, downstream of the air gap, to the standard disposer drain plumbing fittings conventionally encountered in most household plumbing systems. Most plumbing codes (and R/O manufacturer's warranties) prohibit the connection of R/O waste water drain line anywhere in the outlet plumbing elbow of the disposer because of the danger of clogging by the relatively high velocity discharge from the disposer when the same is operated in the disposal grinding mode to grind and wash down garbage and similar refuse. Such codes also require the R/O waste water drain line to be connected upstream of a suitable sewer trap. Hence in the case of single compartment, disposer-equipped sinks there may be no alternative (except for using the adapter coupler invention disclosed in my co-pending parent application Ser. No. 08/206,850 filed Mar. 7, 1994, incorporated herein by reference, now U.S. Pat. No. 5,449,456) for the R/O System installer but to run the R/O waste water drain line down through the kitchen floor to a laundry sink standpipe or available basement or cellar floor drain or to install (if not already present) a conventional multi-port dishwasher air gap fixture which drains out into a dishwasher drain hose or a branch tailpiece. Of course, either of these prior art procedures is expensive and time consuming from the labor and material standpoint, and in some instances a suitable connection of this type may not be economically feasible or even available, thereby effectively preventing installation of the R/O System.

Even in those residential kitchen sink installations which are provided with a double compartment sink, certain installation problems remain. In such double sink installations one of the sinks or sink compartments carries the garbage disposer, and the other, non-disposer sink, has its waste water outlet connected via standard plumbing fittings, which includes a horizontal outlet run leading into a conventional baffle Tee-fitting connected between the disposer elbow and sink drain trap (or to its own trap). This disposer Tee has an interior baffle which operates to divert the downward discharge from the disposer elbow away from and past the Tee-inlet connected to the non-disposer sink plumbing. Plumbing codes permit the R/O waste water drain line connection to enter such non-disposer sink waste plumbing upstream of the disposer baffle Tee because of the isolation provided by its interior baffle. Accordingly, commercially available R/O System installation equipment often includes conventional drain saddle hardware fittings, i.e., split clamp straps, mounting fasteners and an associated drain saddle elbow for making this waste water drain connection to such existing plumbing fittings. However, this requires that a suitable hole be drilled into either the vertical or horizontal run of the non-disposer sink outlet plumbing fittings, and the drain saddle clamp fitting registered and clamped to communicate the elbow with the drilled hole.

Although kitchen double compartment sinks thus can physically accommodate connection of the R/O waste water drain line upstream of the disposer baffle Tee and in the immediate vicinity of the undercounter R/O System installation, more and more state and local plumbing codes prohibit the use of saddle-type valves and/or drain connections. Indeed, current efforts are well underway or have been completed to ban saddle-type valve or drain connections in all fifty states. Hence in such states, even with a double compartment sink plumbing arrangement incorporating a disposer baffle Tee, the R/O waste water drain line outlet again must be run from under the kitchen counter to the basement or some other area having a standpipe or drain arranged to feed into a suitable entry point to the household sewer system, such as the aforementioned laundry sink standpipe or basement floor drain. Such waste water drain line connection problems have seriously impeded or prevented retrofit installations of R/O filter systems in existing dwelling structures, particularly in older residences and in well developed older communities supplied with municipal water, where such R/O water filter systems are particularly needed.

OBJECTS OF THE INVENTION

Accordingly, it is an object of the present invention to provide an improved R/O waste water drain line outlet connection system and hardware which overcomes the aforementioned problems in a simple, efficient, reliable and economical manner.

Another object of the present invention is to provide an improved drainage system and fittings for safely and readily coupling the R/O waste water drain line to existing household single sink disposer-dishwasher inlet plumbing in the immediate vicinity of the undercounter R/O filter system installation.

Yet another object of the present invention is to provide a simple and inexpensive improved plumbing adapter coupling fitting for connecting the R/O waste water drain line to the existing undercounter single or double sink garbage disposer plumbing, whether or not equipped with a dishwasher, and which is easy to install and highly compatible with existing inexpensive plastic tubing or rubber hoses and associated plumbing fittings of conventional design and standardized, code-approved construction.

A further object of the present invention is provide an improved waste water drain line outlet adapter coupling fitting of the foregoing character which can be either preassembled, readily assembled and disassembled and converted as needed on site with a screwdriver, hacksaw and hammer, which at the most are the only needed tools.

Yet another object of the present invention is to provide an improved R/O waste water drain line adapter coupling which is economical to manufacture and install, provides universal connections for accommodating dishwasher drain hoses of ⅝ inch or ⅞ inch ID (inside diameter), by being convertible on site to fit such two different sizes of dishwasher drain hoses, or further converted in installations without dishwashers to provide a slip fit coupler to the disposer dishwasher inlet, and in either event provides a permanently installed speed fit/push-in connector for removably coupling the R/O waste water drain tubing into the disposer dishwasher inlet.

Another object is to provide an improved reverse osmosis drain line adapter coupling of the aforementioned character which permits continuous or intermittent drainage of R/O waste water through existing household plumbing fittings in undercounter installations while eliminating noisy trickles or other annoying drain liquid flow noises usually associated with such R/O waste water discharge.

BRIEF DESCRIPTION OF THE DRAWINGS

Other objects, features and advantages of the present invention will become apparent from the following detailed description, appended claims and accompanying drawings (which are drawn to scale unless otherwise indicated), in the several figures of which like reference numerals identify like elements, and wherein:

FIG. 8 is a fragmentary elevational view of the circled portion numbered 8 in FIG. 1, but slightly enlarged thereover and with certain of the structure shown in FIG. 1 omitted for clarity.

FIG. 9 is a fragmentary exploded perspective view of the drain line adapter coupling installation as employed in conjunction with a dishwasher drain hose in the set up of FIG. 1.

FIG. 10 is a fragmentary elevational view similar to FIG. 8 but illustrating the drain line adapter of FIG. 2 converted pursuant to the invention for use in undercounter R/O installations where a dishwasher has not been provided.

FIG. 11 is a fragmentary exploded perspective view of the drain line adapter coupling as converted to be utilized in the system of FIG. 10.

DETAILED DESCRIPTION OF PRESENTLY PREFERRED EMBODIMENT

Figure 1:
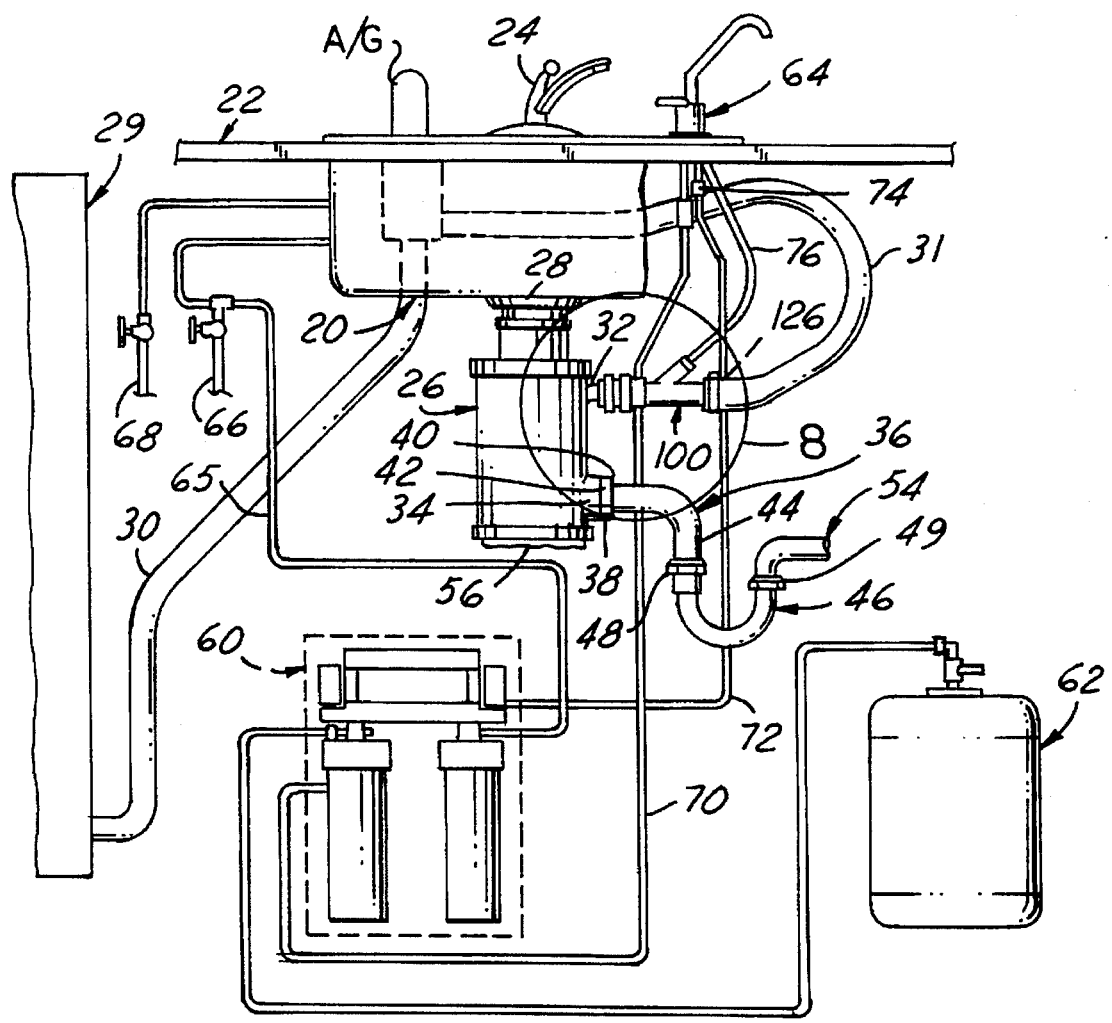
FIG. 1 is a fragmentary elevational and semi-diagrammatic view of a typical household single compartment sink kitchen undercounter installation shown after the installation of the R/O filter system improvements of the present invention and having a conventional garbage disposer installed therebeneath, a dishwasher drain line being connected to the disposer upper side nipple inlet in accordance with and utilizing a preferred embodiment of an adapter coupling system and connector apparatus of the present invention, and the disposal outlet elbow connected via a conventional trap to a horizontal waste line.

Referring first to FIG. 1, a typical residential single compartment kitchen sink undercounter installation is illustrated after retrofit installation of an R/O system in accordance with the present invention. Such a single sink set-up includes a single compartment sink 20 mounted through a suitable opening in a kitchen counter 22, and an associated conventional water dispensing faucet 24 (herein illustrated as a single lever hot and cold water mixing faucet). A conventional garbage disposer 26 is suspended in the usual manner from sink 20 with its upper main inlet in communication with the single sink waste outlet 28. A conventional undercounter automatic dishwasher unit 29 has its dishwater drain line 30 (having in almost all instances a ⅝" inside diameter ("I.D.")) connected via a conventional sink-top-mounted air gap unit A/G, and thence via a dishwasher air gap drain line hose 31 (having in almost all instances a ⅞" I.D.) to an R/O drain line adapter coupling of the present invention in turn connected, to the upper side inlet nipple fitting 32 of disposer 26. The outlet 34 of disposer 26 is coupled to a disposer elbow 36 by a flange clamp 38 and associated mounting bolts 40, the connection being sealed by a disposer drain gasket 42. The vertical run 44 of elbow 36 is typically connected to a conventional sink trap 46 by a slip joint nut 48 and associated slip joint beveled washer (not shown). The outlet end of trap 46 is similarly connected by a slip joint nut 50 to the elbow 52 of a horizontal waste line trap arm 54 leading to the main sewer drain of the household. Typically the garbage disposer installation instructions require that the disposer waste line 54 and associated trap 46 be plumbed at the appropriate elevation to prevent standing water in the disposer motor housing 56.

It is to be noted that the single sink/disposer installation of FIG. 1 cannot accept a waste water saddle-drain type connection from an R/O filter system because there is no place to connect the drain saddle provided with such a system to the disposer waste line. The saddle clamp and pierce (or drilled hole) type fixture cannot be connected to the horizontal waste line 54 since it is downstream of trap 46, nor can it be connected to the elbow 36 without voiding the system manufacturer's warranty and violating the laws and plumbing code ordinances (plumbing codes or Uniform Plumbing Code) of substantially all towns and municipalities. Hence hitherto (prior to the advent of the adapter coupler invention disclosed in my aforementioned co-pending parent application Ser. No. 08/206,850, filed Mar. 7, 1994, which is incorporated herein by reference) the R/O waste water drain line had to be run through the aforementioned relatively expensive multi-port dishwasher air-gap fixture (if available) or through a hole drilled in the kitchen floor to a basement laundry sink standpipe or to closest available basement or cellar floor drain. If such fixtures or drains were not available or accessible this condition has in most instances forestalled installation of the desired R/O filter system. Moreover, even if such remote drain connections were available, the cost of running the waste water drain line to the same often was uneconomic and/or created maintenance problems due to the excessive length and small diameter of such waste water tubing increasing the risk of clogging.

However in accordance with a principle feature of the present invention, a conventional R/O filter system designed for undercounter installation now can be easily and inexpensively installed in such a single sink/disposer set-up so as to utilize the disposer dishwasher waste drain inlet fitting to receive the reject waste water from the R/O system.

Referring to FIG. 1, the single sink/disposer kitchen undercounter installation of FIG. 1 is shown in conjunction with the installation of a typical commercially available reverse osmosis drinking water appliance (illustrated diagrammatically). Such a commercial residential R/O drinking water appliance, for example, may be that made by Water Factory Systems (a unit of Commercial Intertech) of Irvine, Calif., Series N4000, N4500 or N5000, and typically includes a purification assembly 60, a storage tank 62, and a combination filtered water dispensing faucet and air gap module assembly 64 mounted on the rear rim of sink 20. Unfiltered potable water is supplied to the system via a tubing connector 65 connected to the existing cold water supply line 66 which is usually run adjacent to the household hot water supply line 68. Fully filtered product water is delivered from the R/O system via an output tube 70 connected to the dispensing faucet assembly 64. The R/O system reject waste water is conducted from the R/O assembly 60 by a tube 72 leading up to the vertical spout 74 of the air gap assembly included in faucet assembly 64. This R/O waste water is then returned from the air gap assembly via the R/O waste water drain line tubing 76 to an improved waste water drain coupling 100 provided in accordance with the present invention.

Figure 2:
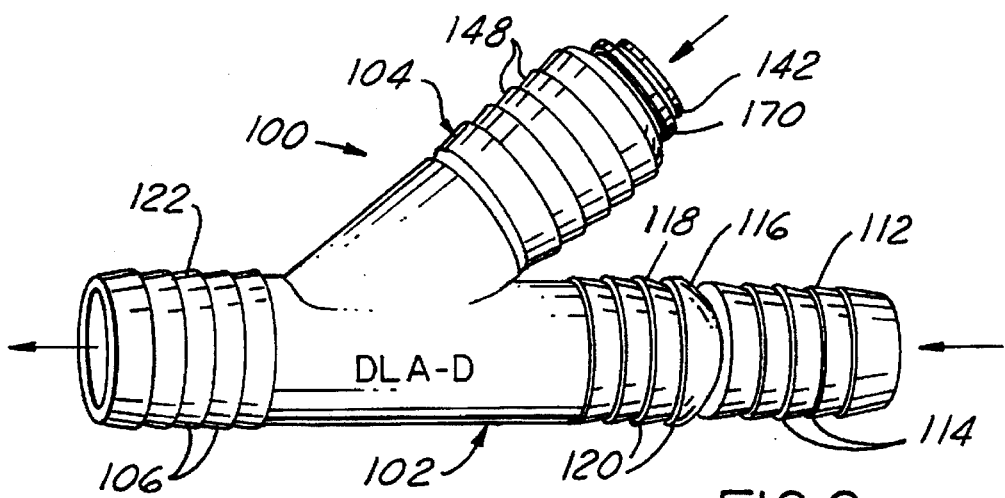
FIG. 2 is as elevational and slightly isometric view of a presently preferred embodiment of the waste water adapter coupling improvement of the present invention as utilized in the system of FIG. 1 shown by itself and greatly enlarged over the view thereof in FIG. 1.
Figure 3:
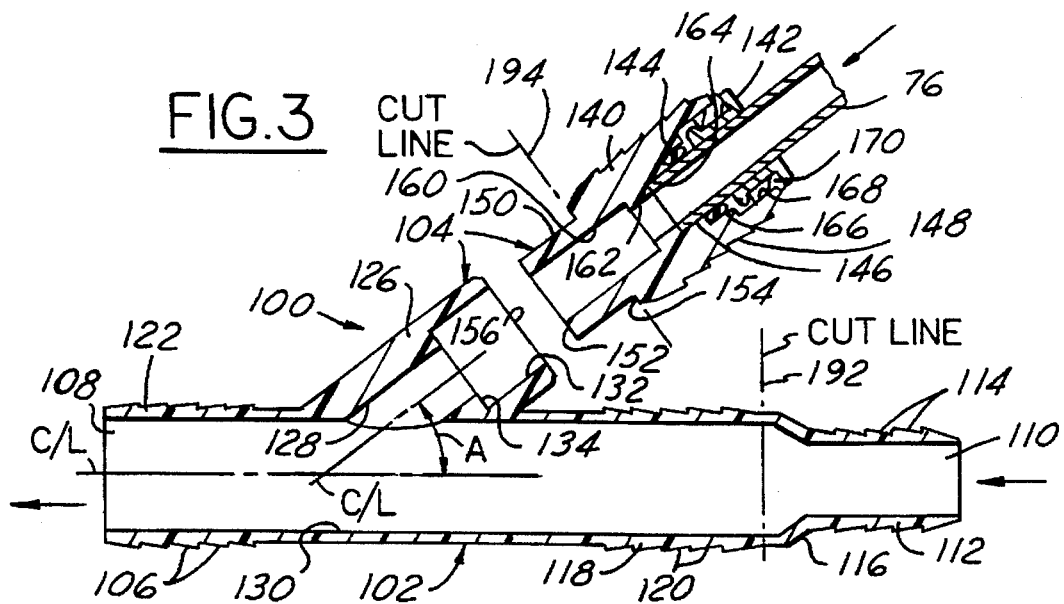
FIG. 3 is a fragmentary vertical center section taken along the axis of the adapter coupling of FIG. 2 with the R/O waste line branch fitting of the adapter shown separately exploded and with an R/O drain tube inserted in the speed fit/push-in connector thereof.

As best seen in FIGS. 2 and 3, coupling 100 is made up almost entirely of inexpensive, commercially available rigid tubular plastic plumbing fitting material such as polypropolyne (PP), polyvinylchloride (PVC) or acetal materials currently mass produced for the household plumbing fitting industry.

Figure 4:
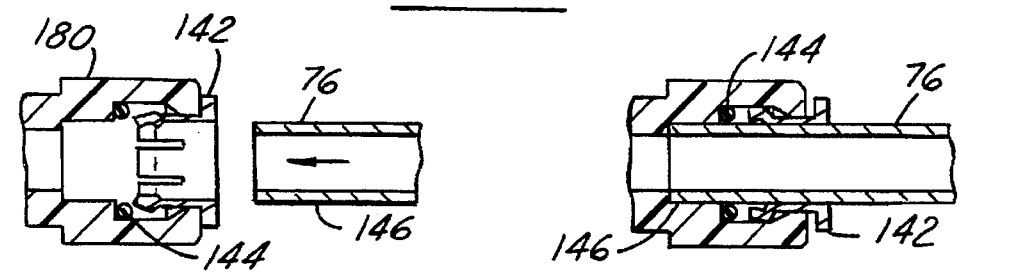
FIG. 4 is a side elevational view with portions of the adapter coupling of FIGS. 1–3 shown as severed along cut lines to illustrate conversion of the adapter coupling to different usages.

Referring in more detail to FIGS. 2, 3 and 4, adapter coupling 100 generally comprises a specially designed type of "Y"-Tee rigid tubular plastic fitting provided with several novel features of the present invention for achieving the aforestated objects. Coupling 100 comprises a double-ended hollow tubular main barrel portion 102 and a hollow tubular branch inlet portion 104 intersecting barrel portion 102 at an included acute angle "A" between the center line axis C/L of barrel 102 and the center line axis C/L' of branch 104, angle A being preferably about 38° as illustrated in FIG. 3. However angle A can vary preferably in a range of about 30° to 50°.

The main barrel portion 102 comprises a double ended male hose fitting with a row of annular hose nipple barbs 106 integrally mold formed on the exterior surface of the outlet end 108 of barrel 102 to form a hose nipple outlet 122 on this end of coupling 100. The inlet end 110 of barrel 102 is provided with a reduced diameter hose nipple portion 112 having a row of annular hose nipple barbs 114 on the exterior surface thereof and diametrically sized for a sealing slip fit thereon of the dishwasher flexible rubber drain hose 30 (FIG. 9) having an inside diameter of ⅝ inches. Nipple 112 integrally merges at its outlet end through a rounded frusto conical portion 116 with an enlarged secondary hose nipple portion 118. A row of annular barbs 120 are also mold-formed on the periphery of nipple portion 118 and diametrically sized to receive with a sealing slip fit thereon the larger diameter dishwasher flexible rubber drain hose 31, i.e., having an inside diameter of ⅞ inches. The outside diameters (O.D.) of primary nipple portion 112 and secondary nipple portion 118 thus are adapted to respectively accommodate the two most common dishwasher drain hose sizes currently prevalent in use on household residential dishwasher appliances. It is to be understood that the installer will encounter a hook up with a ⅝" I.D. drain hose 30 only when the dishwasher has been installed (albeit improperly) without an air gap fixture A/G, but unfortunately this happens frequently.

The outlet nipple portion 122 of barrel 102 is diametrically sized with its barbs 106 to sealingly slip fit one end of a short length of a flexible rubber hose coupler 124 (FIG. 9), which may be made of the same material as the standard dishwasher drain hose 30, 31.

The tubular inlet branch portion 104 of coupling 100 comprises a hollow rigid stem portion 126 preferably molded integrally in a conventional plastic injection molding process as a cylindrical protuberance oriented with its axis C/L' at angle A to the axis C/L of barrel portion 102. Stem 126 has a bore 128 opening to the hollow interior main bore 130 of barrel 102, as best seen in FIG. 3. Bore 128 at its upstream end opens to a larger diameter counterbore 132 at a shoulder 134 therebetween.

Inlet branch 104 also includes a "Push-In" connector fitting subassembly 140 which includes a commercially available push-in catch and release collet 142 and associated O-ring seal 144 for quickly and releasably attaching the outlet end 146 of a standard size R/O waste water drain tube 76. The main body portion of fitting 140 is formed on its exterior as a male hose nipple having a row of annular barbs 148 oriented for receiving a ⅞ inch I.D. hose coupling 124, as described in more detail hereinafter. The downstream end of fitting 140 is formed with a reduced diameter cylinder sleeve portion 150 sized for close slip fit insertion into bore 132 so that in assembly the end face 152 of sleeve 150 abuts shoulder 134, and the exterior shoulder 154 at the junction of sleeve 150 with the main body portion of fitting 140 abuts or is closely spaced to the end face 156 of branch protuberance 126. As so assembled, fitting 140 is permanently affixed to protuberance 126 by a conventional ultrasonic weld joint so as to become an integral portion of branch inlet 104.

The interior of fitting 140 has a through passageway as defined by a series of bores and counterbores 160–168. Bore 160 extends from the outlet end to a slightly smaller diameter central bore 162 in turn terminating at an internal shoulder at its upstream end where it opens to a counterbore 164. The outlet end 146 of the R/O drain tube 76 which is received in bore 164 with a slip fit. Bore 164 terminates at its upstream end at a slightly larger diameter counterbore 166 which receives O-ring 144. Bore 166 at its upstream end opens to a slightly larger counterbore 168 which receives the subassembly of collet 142 and the associated cap-collar 170. Cap-collar 170 is ultrasonically welded to the surface of bore 168 to permanently affix this "Push-In" speed fit connector in fitting 140.

Figures 5, 6, 7:
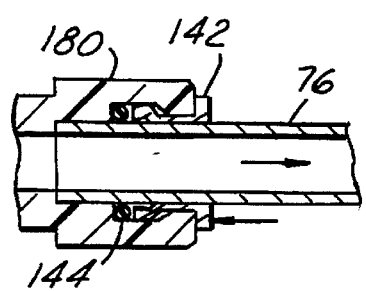
FIGS. 5, 6 and 7 are semi-diagrammatic fragmentary center sectional views illustrating the use and operation of the standard commercially available speed fit/push-in connector provided as part of the adapter coupling of the invention.

It is to be understood that parts 142, 170 and 144 are commercially available from such manufacturing sources as John Guest U.S.A., Inc. of Totowa, N.J. (such as their Model WC-385-05 ⅜" Acetal Copolymer-Food Grade Collet/Cap System) or from Parker Hannifin Corporation of Ravenna, Ohio. ("Parflex TrueSeal"™ quick-connect tubing fittings). It is also to be understood that bores 164, 166 and 168, as well as the upstream end portion of fitting 140, are made in preferably three different sizes to accommodate speed fit/push-in connection to fitting 140 of R/O drain tubing O.D. sizes of ¼", ⅜" and ½", the ⅜" O.D. size tubing being by far the most common in current use in residential household reverse osmosis drinking water filtration systems. The operation of such commercially available speed fit/push-in connection is well understood and is shown diagrammatically in the sequence of the views of FIGS. 5, 6 and 7 respectively. To connect the outlet end 146 of R/O drain tube 76 to a commercially available slip fitting assembly 180 containing the collet 142 and O-ring 144, outlet end 146 is manually pushed straight into collet 142 about ¾" (for size ⅜") until it abuts the stop shoulder corresponding to the shoulder between bores 164 and 166 in fitting 140, as shown in FIG. 6. A slight separational force exerted on tube 76 relative to fitting 180 will cause the collet barbs to be cammed to dig further into the plastic material of tube 76 (typically calibrated nylon polyethylene or similar tube of sufficient rigidity) as the exterior flange of collet 142 moves slightly away from fitting 180, as seen in FIG. 6. To release tube 76 from fitting 180 the collet flange is pushed against fitting 180 to release the grip force of the collet barbs on tube 76 while tube 76 is being pulled out from fitting 180, as shown by the arrows in FIG. 7.

Referring to FIG. 9, preferably the adapter coupling 100 of the invention is provided to both the professional and home do-it-yourself market as a convenient drain line adapter kit which includes adapter coupling 100 as well as conventional fittings including a 2 inch long by ⅞ inch I.D. hose coupler 124 and two standard commercially available stainless steel hose clamps 182 and 184, along with printed installation instructions. This kit in use provides all that is needed in materials to make a quick and inexpensive connection of the outlet end of R/O waste water drain tube 76 to the existing undercounter household plumbing system for sink 20 as already been provided with garbage disposer 26, and when an associated automatic dishwasher 29 is either present or absent.

Consider first the situation where a dishwasher 29 is present and the dishwasher drain hose 31 downstream of the required air gap ("A/G") has been connected to the standard dishwasher drain hose inlet nipple 32 of disposer 26 (FIGS. 1, 8 and 9) by a standard hose clamp. Then the outlet end of dishwasher hose 31 is removed from nipple 32 by loosening the associated hose clamp (not shown). The old hose clamp may be discarded and the interior passage of nipple 32 checked and cleaned if needed. Then with hose clamps 182 and 184 loosely sleeved on hose coupler 124, the downstream end of coupler 124 is slipped fully onto nipple 32 and clamp 184 registered over nipple 32. The outlet nipple 122 of coupling 100 is then inserted into the upstream end of hose coupler 124 until the outlet end 108 abuts nipple 32 within hose coupler 124. Hose clamp 182 is then aligned in registry with nipple 122. Then both of hose clamps 182 and 184 are securely tightened to thereby removably sealably attach coupling 100 to the dishwasher inlet 32 of disposer 26.

If the dishwasher drain hose 30 already provided with dishwasher 29, having the standard ⅝ inch I.D., has been directly connected to nipple 32 (no air gap fixture A/G being present), then the outlet end of hose 30 can be likewise disconnected from nipple 32 and then reconnected to disposer 26 by sealingly slip fitting the same onto inlet nipple 112 of coupling 100 so as to entirely cover the nipple barbs 114. Dishwasher drain hose 30 may be securely attached using the old hose clamp 186 (FIG. 8) if in good condition, or a new hose clamp 186 may be provided as one of the parts in the installation kit for the convenience of the installer.

Then all that remains to complete the installation is to insert the outlet end 146 of the R/O waste water drain tube 76 into the push-in connector subassembly provided in fitting 140, as described previously in conjunction with FIGS. 3 and 5–7. The completed installation is shown in FIG. 8.

In performing the foregoing installation procedure certain recommendations should be observed. The coupling 100 is designed to be installed on a garbage disposer only, and preferably downstream of an approved air gap A/G connected between the dishwasher drain hoses 30 and 31, and downstream of an approved R/O air gap assembly 64 to which the inlet of the waste water drain tube 76 is connected. However, where only hose 30 is present, coupling 100, by being connected downstream of the R/O air gap 64 can help make up for the absence of air gap fixture A/G by providing an air vent into the dishwasher drain hose.

The orientation of coupling 100 as installed should be with the branch inlet 104 facing upwardly. The arrow mark 190, provided as a permanent marking embossed on the exterior of barrel 102, should be pointing towards disposer 26 (see FIGS. 8 and 9). Coupling 100 should also be oriented with axis C/L of barrel 102 oriented from horizontally to inclined slightly upwardly in a direction away from the disposer 26 so that inlet nipple 112 is at the same or slightly higher elevation than outlet nipple 122. To insure that nipple 112 is not oriented at an elevation below outlet nipple 122, the installer, if necessary, should cut off a portion of the outlet end of tube 76, as well as the outlet end of the dishwasher drain hose 30, so that each of these hoses terminate in a length that will prevent any slacking or sagging of coupling 100 below the aforementioned preferred orientation. In other words, the cut to fit should be such that these hoses exert a slight tension on coupling 100 since it is these hoses that will primarily determine the final orientation of coupling 100 as installed.

In accordance with another feature of the present invention, if dishwasher 29 has been properly connected to air gap A/G by the ⅝" I.D. hose 30 (as shown in FIG. 1), and the installation likewise has been provided with the air gap drain hose 31 having a ⅞ inch I.D., instead of the smaller hose 30 being directly connected to disposer 26, coupling 100 can be quickly converted for use with such larger diameter hose 31. In this case, prior to performing the aforementioned installation steps, the installer severs the smaller diameter nipple 112 from the larger diameter nipple 118 of coupling 100 by using a hacksaw to saw off nipple 112 along the cut line 192 as shown in FIGS. 3 and 4. The larger diameter bore 130 of barrel 102 now terminates at its inlet end at this cut line so that there is no restriction to flow from the larger diameter dishwasher drain hose 30. Hose 30 is thus then sealingly slip fit over barbs 120 of nipple 118 and fastened thereto with the hose clamp 186. The sawed-off smaller nipple 112 is discarded. Thus due to this feature of coupling 100 the installer need not be concerned as to which of the two standard sizes of dishwasher drain hoses 30 or 30' will be encountered in this original or retrofit installation of the drain line adapter coupling 100 of the invention.

In accordance with another feature of the present invention, coupling 100 is also readily convertible from its form as initially provided into another form readily adapted for use in connecting R/O drain tube 76 into disposer 26 when no dishwasher is present at the installation site. In this event, prior to performing the installation procedure, coupling 100 is converted for use as a straight-end fitting connection to the unused dishwasher drain inlet nipple 32 of disposer 26. To so convert coupling 100, branch inlet 104 of the coupling is severed from the coupling by using a hacksaw to saw along the cut line 194 as shown in FIGS. 3 and 4. This severs fitting 140 from protuberance 126, leaving sleeve portion 150 as ultrasonically welded in place in protuberance 126 and provides a planar end face 198 (FIG. 11) on what is now a shortened male nipple fitting 140' (FIG. 11) ready for use in this non-dishwasher installation site. The remainder of coupling 100 is discarded.

The installer first shuts off power to the disposer 26 (unplugs the disposer, opens the circuit breaker and/or removes the fuse in the power circuit to disposer 26). Then the installer next removes the knock-out plug closure (not shown) conventionally provided in disposer nipple 32, which is still present because no dishwasher has been installed. The installer simply uses a hammer and screw driver to punch in the knock-out plug with a few sturdy blows, and also makes sure that a clean round hole remains into disposer 26 through nipple 32. After the nipple plug has been knocked into the disposer from the outside, the rubber and/or broken metal disc which forms the knock-out plug must be removed by hand, or with tongs and a flashlight, from the interior of the disposer, the installer making sure that all such debris is removed from the interior of the disposer before running the disposer after installation.

After this preparatory operation has been performed the installer is then ready to perform the R/O waste water drain hook-up. This is done by again slipping the outlet end of hose coupling 124 onto the disposer inlet nipple 32 and registering hose clamp 184 thereover. Fitting 140' is then inserted into the inlet end of hose coupler 124 until the cut end face 198 abuts the end face of nipple 32 within hose coupler 124. Hose clamp 182 is then registered over coupler 124 centrally aligned with nipple barbs 106. Both of the hose clamps 182 and 184 are then securely tightened down to sealably connect and fasten fitting 140' to disposer nipple 32. Then all that remains is to insert the outlet end 146 of the R/O waste water drain tube 76 into the push-in connector 142 of fitting 140' to thereby connect tube 76 to disposer 26 as shown in FIG. 10. Again, tube 76 may be cut to the appropriate length to insure good gravity drainage of waste water into the disposer (i.e., no sag in tube 76 or fitting 140' and hose coupler 124).

From the foregoing description it will now be apparent that coupling 100 and the R/O waste water drain coupling system of the invention utilizing coupling 100 provides many novel features and advantages which amply fulfill the aforestated as well as other objects of the invention. In a dishwasher installation of FIGS. 1 and 8, coupling 100 will not interfere with dishwasher drainage or function. In fact, the frequent discharge of flow of waste water from the reverse osmosis tube 76 will help to remedy the periodic build-up of garbage at the disposer inlet 32 by the cleaning effect of this R/O waste water flow. Additionally, although sufficient empirical test data is not yet available for complete verification, it nevertheless is presently believed that periodic dishwasher drain flow through Y-Tee coupling 100 can help by a siphon-cleaning action, remove debris from R/O drain tube 76 if present therein from disposer back-up occurrences. Moreover, the installation kit including coupling 100 is universal in nature; only the size of the John Guest or other commercial push-in connector assembly 142, 170 etc. is fixed in advance and specified on the installation kit. Thus each manufacturer/dealer/home owner installer must of course chose the correct size so specified to match the O.D. of tube 76 provided with the reverse osmosis filtration system to be installed (usually ⅜ inch O.D. tubing but in some cases it may be ¼ inch or ½ inch O.D. tubing).

The R/O waste water drain hook-up installation procedure as specified above is very easy for both the professional installer as well as the lay home owner. Minimal tools are required, in some cases only a screw driver, but depending on the conditions encountered, also a razor knife and hacksaw, and where a dishwasher is not installed, also a hammer. Installation is very fast as compared to all other known methods where a dishwasher is associated with the installation. In a non-dishwasher installation, installation time is about the same as when connecting a dishwasher drain hose to the disposer.

Preferably coupling 100 is provided packaged in kit form as described above with everything required for installation except the aforementioned installation tools. There is no need to open or disturb existing plumbing pipes. The installation system thus involves only flexible rubber hose secured by stainless steel hose clamps which will not break when removed. The R/O waste water tube 76 is quickly and reliably removably connected using the proven commercially available push-in connector structure.

Coupling 100 is readily convertible to accept either of the two standard sizes of dishwasher drain hoses 30 or 31 so that the installer need not be concerned in advance as to which he will encounter at the installation site. Likewise, if the installer finds no dishwasher present, coupling 100 can be readily converted to provide the straight-in coupling 140' to perform the R/O drain tube installation shown in FIG. 10.

Thus the reverse osmosis waste water drain installation system and coupling of the present invention overcomes the several problems discussed previously in a reliable, simple, economic and safe manner. The system and coupling embodiments of the present invention now enable rejector waste water drain lines of the conventional commercially available reverse osmosis drinking water appliances to be quickly and easily installed in single sink/disposer undercounter household or commercial (e.g., restaurant) installations, or in double sink installations where one of the sinks is provided with a disposer, whether existing or newly installed, while satisfying the uniform plumbing code criteria for such waste water hook-ups, as well as complying with manufacturers' warranties.

The structure of coupling 100 as disclosed hereinabove in its preferred embodiment is readily adaptable to economical mass production plastic injection molding processes and equipment. The two-piece permanent assembly of the branch inlet 104 is provided to enhance compatability with such manufacturing processes, as will be readily understood by those skilled in the art from the foregoing description. The three different sizes of fitting 140 required at its inlet to accommodate the different size commercial push-in connector parts can be economically manufactured and inventoried for assembly to the standardized part 102. Preferably parts 102 and 140 of coupling 100 are made of plastic material such as polypropolyne (PP), polyvinylchloride (PVC) or acetal coploymer (food grade) to provide an inexpensive, long lasting and corrosion resistant coupling fitting which can be accurately and economically manufactured to relatively close tolerances by conventional injection molding processes.

Additional combinations utilizing further variations in the couplings and system hook-ups illustrated and described hereinabove will also become apparent from the foregoing disclosure by those skilled in the art to meet the wide variety of undercounter installation problems encountered in the field due to additional water consuming appliances also be installed undercounter in the vicinity of the sink.

It is also to be understood that, although the foregoing description and drawings describe and illustrate in detail a preferred embodiment of the present invention, to those skilled in the art to which the present invention relates the present disclosure will suggest many modifications and constructions as well as widely differing embodiments and applications without thereby departing from the spirit and scope of the invention. The present invention therefore is intended to be limited only by the scope of the appended claims and the applicable prior art.

What is claimed is:

1. In an undercounter reverse osmosis (R/O) water filtration installation associated with an in-counter sink having a garbage disposer suspended therefrom and in drainage communication therewith, the garbage disposer having an outlet connected to a sink drain trap plumbed to an associated sewer system and having a dishwasher drain water inlet nipple disposed above said disposer outlet, and in which the R/O installation includes a reverse osmosis reject waste water by-pass conduit means including an air gap and operable for flushing the R/O waste water into an R/O waste water drain line tube, the improvement in combination therewith of an improved undercounter R/O waste water drainage system for coupling the R/O waste water drain line tube into the sink drain trap in serial drainage relation with the disposer outlet plumbing fittings, said improvement comprising:

an adapter coupling means communicating an outlet end of said R/O drain line tube with said garbage disposer dishwasher drain water inlet nipple, said coupling means comprising a flexible coupler hose having an outlet at one end and inlet at the opposite end thereof, said hose having its outlet end slip fit onto said disposer inlet nipple, a first hose clamp encircling and sealably clamping said hose coupler outlet end onto said disposer inlet nipple, and rigid tubular conduit means having an outlet end provided with a barbed male nipple slidably received in said hose inlet, a second hose clamp encircling and sealably clamping said hose coupler inlet end onto said conduit means outlet end barbed nipple, said conduit means having a R/O waste water first inlet and a first through-passageway communicating said conduit means R/O inlet with said conduit means outlet, said conduit means further having connector means permanently installed in said conduit means R/O inlet, said R/O waste water drain line tube having an outlet end slip-fit coupled via said connector means in said conduit means R/O inlet whereby R/O reject waste water drains via said R/O drain line tube through said adapter coupling means into said disposer via said nipple inlet thereof and thence via the interior of said disposer and through said disposer outlet and the sink drain trap to the sewer system.

2. The installation as set forth in claim 1 wherein said installation also includes an automatic dishwasher installed undercounter adjacent said sink, and wherein said conduit means has a second inlet end for receiving dishwasher drain water and a second through-passageway communicating said second inlet with said first passageway between said first passageway inlet and outlet, said second inlet having a barbed hose nipple sealably slip-fit receiving the outlet end of a dishwasher drain hose communicating at its inlet end with the outlet of a drain pump of the dishwasher, and a third hose clamp sealably clamping said dishwasher drain hose outlet onto said conduit means second inlet.

3. The installation as set forth in claim 2 wherein a first portion of said first passageway extending from said conduit means outlet to the intersection with said second passageway is coaxial with the axis of said second passageway, a second portion of said first passageway extending from such intersection to said conduit means R/O first inlet and being oriented with its axis at an acute angle to said second passageway axis so as to be directed generally in a downstream direction toward said conduit means outlet.

4. The installation set forth in claim 3 wherein said second passageway axis is oriented in the range from generally horizontal to slightly inclined upwardly from horizontal, and said second portion of said first passageway in turn is further inclined upwardly relative to said second inlet.

5. The installation set forth in claim 4 wherein said acute angle is in the range of about 30° to about 50°.

6. The installation set forth in claim 5 wherein said acute angle is about 38°.

7. The installation as set forth in claim 4 wherein said conduit means second inlet comprises only a first nipple portion having a planar end face transverse to said axis of said second passageway, formed by severing therefrom a second smaller diameter nipple portion originally located upstream thereof and separated therefrom along a cut line providing said planar end face, said dishwasher drain hose being slip fit and sealably clamped on said first nipple portion by said third hose clamp.

8. The installation set forth in claim 4 wherein said conduit means second inlet has a first hose nipple portion diametrically sized to slip fit sealably accept a dishwasher drain hose having a standard first I.D. dimension, and said conduit means second inlet also having a second hose nipple portion integrally formed with said first hose nipple portion in tandem therewith upstream thereof and diametrically sized to receive a dishwasher drain hose having a second standard I.D. dimension smaller than said first I.D. dimension, said dishwasher drain hose of said installation having said second I.D. dimension and being sealably clamped by said third hose clamp onto said second hose nipple portion of said conduit means second inlet.

9. The installation set forth in claim 2 wherein said conduit means R/O waste water first inlet further comprises a two-part permanent assembly of a stem portion integrally joining said conduit means at the intersection of said first and second passageways, and a severable fitting part containing said connector means at an upstream inlet portion thereof, said fitting part having sleeve means at its downstream end telescopically joined to said stem part and permanently affixed thereto.

10. The installation set forth in claim 9 wherein said fitting part of said conduit means first inlet is formed on its exterior surface as a barbed hose nipple between said sleeve means and said upstream inlet portion thereof, said fitting part being severable from said conduit means by severing the same along a cut line at the junction of said sleeve means with said barbed nipple portion such that said fitting part as so severed is adapted to serve as a straight-in coupling between said R/O waste water drain line to an associated coupler hose sealably slip fit and hose clamp fastened thereon at one end and sealably slip fit at its other end to the disposer dishwasher drain water inlet nipple and hose clamp fastened thereon.

11. The installation as set forth in claim 2 wherein said conduit means second inlet comprises only a first nipple portion having a planar end face transverse to said axis of said second passageway, formed by severing therefrom a second smaller diameter nipple portion originally located upstream thereof and separated therefrom along a cut line providing said planar end face, said dishwasher drain hose being slip fit and sealably clamped on said first nipple portion by said third hose clamp.

12. The installation as set forth in claim 11 wherein said connector means is in the form of a push-in type fitting having a catch and release collet and associated O-ring seal and being permanently installed in said R/O waste water first inlet of said adapter coupling conduit means, said outlet end of said R/O waste water drain line tube being slip fit inserted into said push-in type fitting so as to be releasably captured by said collet thereof and such push-in connection sealed by said fitting O-ring sealably encircling said tube outlet end within said push-in type fitting.

13. The installation set forth in claim 2 wherein said conduit means second inlet has a first hose nipple portion diametrically size to slip fit sealably accept a dishwasher drain hose having a standard first I.D. dimension, and said conduit means second inlet also having a second hose nipple portion integrally formed with said first hose nipple portion in tandem therewith upstream thereof and diametrically sized to receive a dishwasher drain hose having a second standard I.D. dimension smaller than said first I.D. dimension, said dishwasher drain hose of said installation having said second I.D. dimension and being sealably clamped by said third hose clamp onto said second hose nipple portion of said conduit means second inlet.

14. The installation set forth in claim 13 wherein said connector means is in the form of a push-in type fitting having a catch and release collet and associated O-ring seal and being permanently installed in said R/O waste water first inlet of said adapter coupling conduit means, said outlet end of said R/O waste water drain line tube being slip fit inserted into said push-in type fitting so as to be releasably captured by said collet thereof and such push-in connection sealed by said fitting O-ring sealably encircling said tube outlet end within said push-in type fitting.

15. A waste water drain adapter coupling for use in connecting a first water-using appliance waste water flexible conduct drain line to a dishwasher drain inlet hose nipple of a garbage disposer attached to an in-counter sink for thereby draining waste water from the first water-using appliance through the disposer to a sink drain trap plumbed to an associated sewer system, said coupling comprising a rigid hollow tubular Y-Tee fitting having first and second normally open tubular branch inlet portions arranged with their respective flow axes generally at an acute angle to one another and feeding at a downstream intersection therebetween to a common passageway for receiving the incoming flows from said branch inlet portions, said Y-Tee fitting having a hose nipple tubular conduit portion forming a common outlet of the Y-Tee fitting downstream of said intersection, said Y-Tee first branch inlet portion having connector means permanently mounted thereon at the inlet thereof and adapted for slip joint receiving the outlet end of the first appliance waste water flexible conduit drain line to be thereby coupled in drainage flow communication to the disposer dishwasher inlet nipple, said Y-Tee second branch inlet portion having externally barbed hose nipple means thereon with a row of external hose barbs oriented to slip receive, resist pull off and be hose clamp fastened to the outlet of a second water-using appliance flexible conduit waste water drain line for also communicating the same to the disposer dishwasher drain inlet nipple, said Y-Tee fitting common outlet having hose nipple means thereon with a row of external hose barbs oriented to slip receive, resist pull off and be hose clamp fastened to a coupler hose in turn to be slip received and hose clamp fastened to the disposer dishwasher drain inlet nipple, and wherein said first branch inlet portion also has formed on its exterior surface a row of hose barbs located between said downstream intersection and said connector means of said first branch inlet portion, said first branch inlet portion being severable from said Y-Tee fitting by severing said first branch inlet portion along a cut line located between said intersection and said row of hose barbs of said first branch inlet portion such that said first branch inlet portion as so severed from the remainder of said Y-Tee fitting is adapted to serve by itself as a straight-in coupling between the outlet of either of the water using appliance waste water drain lines and the inlet of an associated coupler hose adapted to be sealably slip fit at one end onto said row of hose barbs at the severed end of said straight-in coupling and hose clamp fastened thereon, the coupler hose being adapted to be sealably slip fit at its other end to the disposer dishwasher drain water inlet nipple and hose clamp fastened thereon, said first branch inlet portion having said row hose barbs thereon oriented to facilitate slip-on and resist pull-off of the one end of the coupler hose when said first branch inlet portion has been severed from said Y-tee fitting to form said straight-in coupling.

16. The coupling set forth in claim 15 wherein said acute angle is in the range of about 30° to about 50°.

17. The coupling set forth in claim 16 wherein said acute angle is about 38°.

18. The coupling set forth in claim 16 wherein said hose nipple means of said coupling second branch inlet has a first hose nipple barbed portion diametrically sized to slip fit sealably accept the second water-using appliance drain line outlet when having a standard first I.D. dimension, and said hose nipple means of said second branch inlet also has a second hose nipple barbed portion integrally formed with and severable from said first hose nipple barbed portion in tandem therewith upstream thereof and diametrically sized to receive the second appliance drain line outlet when having a second standard I.D. dimension smaller than said fist I.D. dimension, said Y-Tee fitting thus being convertible by cutting off said second nipple barbed portion to thereby adapt said Y-Tee fitting to slip fit receive and hose clamp fasten onto said first nipple barbed portion the second appliance drain line outlet when having said first I.D. dimension without obstruction from said second nipple portion.

19. The coupling as set forth in claim 15 wherein said Y-Tee fitting second branch inlet portion hose nipple means comprises only a first nipple barbed portion having a planar end face transverse to the tubular axis of said second branch inlet portion and formed by severing therefrom a second smaller diameter nipple barbed portion originally located upstream thereof and separated therefrom along a cut line providing said planar end face to thereby adapt said Y-Tee fitting for the second appliance drain line outlet being slip fit and sealably clamped on said first nipple portion by a hose clamp.

20. The coupling set forth in claim 15 wherein said first branch inlet portion further comprises a two-part permanent assembly of a stem portion integrally joining said Y-Tee fitting at said intersection of said first and second passageways, and a severable fitting part containing push-in type catch and release collet and associated O-ring seal connector means at an upstream inlet portion thereof telescopically joined to said stem part and permanently affixed thereto.

21. A method of delivering reject waste water from an undercounter reverse osmosis (R/O) water filtration installation to an existing sewer system via the existing drain plumbing hook up of an associated in-counter sink having a garbage disposer suspended therefrom and in drainage communication therewith, the garbage disposer having a drainage outlet connected to a sink drain trap plumbed to the sewer system and having a dishwasher drain water inlet nipple disposed above the disposer outlet, the R/O installation including a reverse osmosis reject waste water by-pass conduit means including an air gap and operable for flushing the R/O waste water into an undercounter R/O waste water drain line tube, said method comprising the step of:

(1) connecting the outlet of the R/O waste water drain line tube to the disposer dishwasher drain water inlet to thereby feed reject waste water from the reverse osmosis water filter installation through the disposer and via the disposer outlet to the sewer system.

22. The method as set forth in claim 21 wherein step (1) comprises the steps of:

(a) providing an adapter coupling having connector means at an R/O waste water inlet thereof communicating with a through-passageway of the coupling and having an outlet end provided with exterior hose nipple barbs, (b) coupling the outlet end of the R/O waste water drain line tube to the connector means, (c) connecting the coupling to the disposer dishwasher drain inlet nipple by providing a coupler hose and slip fitting it at one of its opposite ends onto the hose nipple barbs of the coupling outlet end and at its other end opposite the one end slip fitting it onto the disposer dishwasher drain inlet nipple, and (d) hose clamp fastening the coupler hose onto the coupling outlet end and onto the disposer inlet nipple.

23. The method as set forth in claim 22 wherein said method step (1)(a) comprises providing said adapter coupling in the form of a Y-Tee having first and second branched inlets with the first branched inlet serving as the R/O waste water inlet, and wherein said method step (1)(b) comprises coupling the outlet of the R/O drain tube to the first branch inlet of the coupling, and further including the step of:

coupling the outlet of a dishwasher drain hose of a dishwasher also associated with the sink to the second branch inlet of said Y-Tee such that reject waste water from the reverse osmosis water filtration installation and dishwasher drain water from the dishwasher both flow via the coupling into the disposer dishwasher drain water inlet nipple and via the disposer outlet to the sewer system.

24. The method set forth in claim 23 wherein said method step (a) includes further providing the connector means in the form of a push-in type catch and release collet and associated O-ring fitting permanently installed in the R/O waste water inlet of the adapter coupling, and method step (b) comprises slip fit inserting the outlet end of the R/O waste water drain line tube into such push-in type fitting so as to be releasably captured by the collet thereof and such push-in connection sealed by the fitting O-ring sealably encircling the tube outlet end within the fitting.

\* \* \* \* \*